Feb. 28, 1939.  C. THOM  2,149,034
EGG HOLDING MEANS
Filed March 21, 1938  2 Sheets-Sheet 1
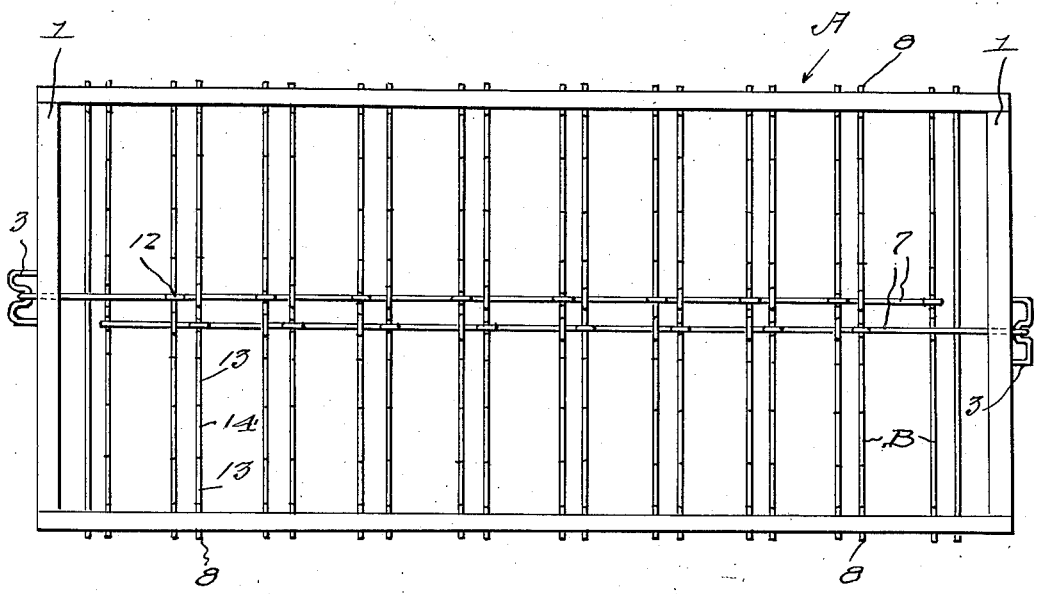
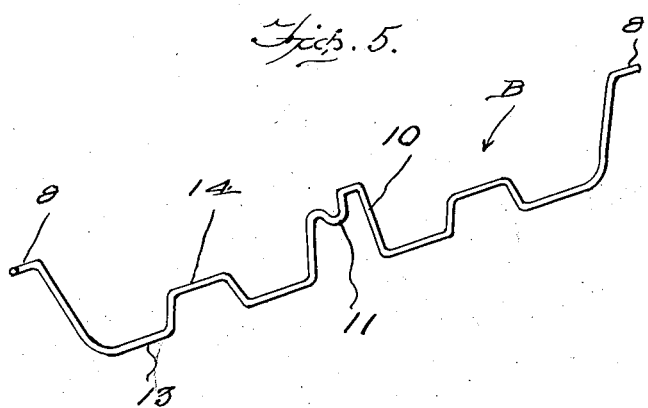
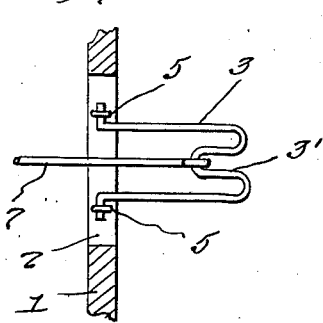
Inventor
Carl Thom
By Clarence A. O'Brien
Hyman Berman
Attorneys Feb. 28, 1939.  C. THOM  2,149,034
EGG HOLDING MEANS
Filed March 21, 1938   2 Sheets-Sheet 2
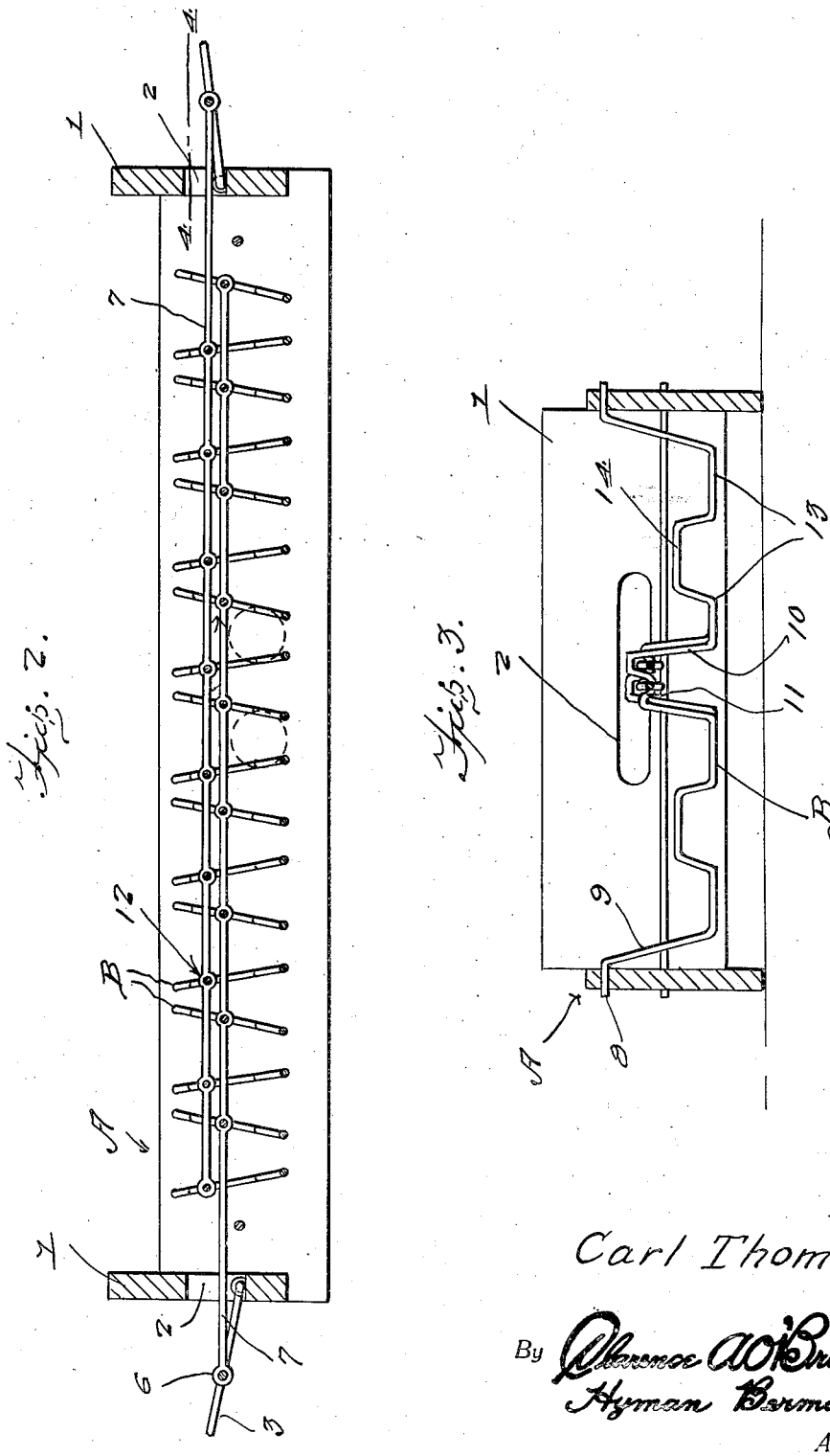
Inventor
*Carl Thom*
By *Clarence A. O'Brien*
*Hyman Berman*
Attorneys Patented Feb. 28, 1939

2,149,034

UNITED STATES PATENT OFFICE 2,149,034

EGG HOLDING MEANS

Carl Thom, Wells, Minn.

Application March 21, 1938, Serial No. 197,277

4 Claims. (Cl. 294—87)

This invention relates to means for holding objects in a tray or the like, the general object of the invention being to provide a plurality of gripping members for engaging and holding a pluality of objects with manually operated means for moving the members to operative and inoperative position.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings, wherein like characters denote like or corresponding parts throughout the several views, and in which:—

Figure 1 is a top plan view of the invention showing it in use for holding eggs in a tray.

Figure 2 is a longitudinal sectional view through Figure 1.

Figure 3 is a transverse sectional view through Figure 1.

Figure 4 is a section on the line 4—4 of Figure 2.

Figure 5 is a perspective view of one of the holding or gripping members.

The drawings show the invention as designed for use in holding eggs in an egg washing machine, such as that forming the subject matter of a patent granted to me on July 13, 1937, No. 2,086,685. However, it is to be understood that the invention is not limited to such use.

In these drawings, the letter A indicates a tray which is open at its top and bottom and which includes the end pieces 1, each of which is provided with a centrally arranged opening 2, to the lower wall of which is pivoted a handle member 3 which is of substantially U-shape with the ends of its limbs bent outwardly and pivotally held in place by the staples or eye members 5. The bight of each member 3 is bent inwardly to provide a small U-shaped part 3'. Two rods 7 are actuated by movement of the handle members 3, said rods having eyes 6 at their outer ends through which pass the bights of the parts 3', one rod extending inwardly from one handle member 3 to nearly the opposite end of the tray and the other rod extending from the other handle member 3 to a similar location.

A plurality of gripping members B extend across the tray and each member is formed of wire or the like and has straight ends 8 which pass through holes in the sides of the tray and are supported for rocking movement therein. From these ends 8 portions of the member slope downwardly and inwardly to form the legs 9 and at the approximate center of the member a substantially U-shaped loop 10 is formed in the wire which extends upwardly and the bight of this part 10 is formed with a small downwardly bowed part 11 which passes through an eye 12 in a rod 7. This part 11 is so formed as to limit lateral movement of an eye 12. Between this member 10 and each leg 9 the wire forms a pair of substantially horizontal parts 13 with an uppardly extending inverted U-shaped part 14 between them.

As shown the members B are arranged in pairs with one member of each pair connected to one of the rods 7 and the other members with the other rod and as the rods are connected with the bights of the members 10 the rods are arranged above the holding parts 13 and 14 of the members B. It will also be seen that when the handles 3 are swung outwardly and downwardly to the position shown in Figure 2 the rods 7 will swing the members B of each pair toward each other so that the parts 13 and 14 will engage and hold the eggs or other objects shown in dotted lines in Figure 2. When the eggs are to be released the handles 3 are swung upwardly and inwardly which will cause the rods 7 to separate the members B and thus the eggs will be released.

With this invention objects, such as eggs, can be picked up and held by the device without being touched by the fingers of the operator and this enables the objects to be handled and operated upon and moved from one place to another with a minimum amount of effort.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:—

1. A device of the class described comprising a supporting frame, a pair of members supported for rocking movement in said frame, each member including a substantially U-shaped part having straight ends which are journaled in the frame, a substantially centrally arranged upstanding part and a small upstanding part between the first mentioned upstanding part and each limb of the member, and means for moving the members on their journals for adjusting the lower portions of said members toward and away from each other.

2. A device of the class described comprising a frame, a plurality of pairs of substantially U-shaped members extending across the frame and having straight ends forming journals which pass through portions of the side parts of the frame, each member having a central upstanding part separating the bight of the members into two portions, each portion having a small upstanding part, rods, one passing through one end of the frame and the other the opposite end thereof, means for pivotally connecting each rod to alternate members at the central upstanding parts thereof, one rod being connected to one set of members and the other rod to the other set whereby longitudinal movement of the rod will rock the members on their journals.

3. A device of the class described comprising a frame, a plurality of pairs of substantially U-shaped members extending across the frame and having straight ends forming journals which pass through portions of the side parts of the frame, each member having a central upstanding part separating the bight of the member into two portions, each portion having a small upstanding part, rods, one passing through one end of the frame and the other the opposite end thereof, means for pivotally connecting each rod to alternate members at the central upstanding parts thereof, one rod being connected to one set of members and the other rod to the other set whereby longitudinal movement of the rods will rock the members on their journals, said end parts of the frame having openings therein through which the rods pass and handle members pivotally connected with the end parts of the frame and pivotally connected with the outer ends of the rods.

4. A device of the class described comprising a supporting frame, a plurality of pairs of substantially U-shaped members extending across the frame and having straight ends forming journals which pass through portions of the side parts of the frame, each member having a plurality of spaced upstanding portions on its bight and means for moving the members on their journals for adjusting the lower portions of said members toward and away from each other.

CARL THOM.